Patented Oct. 18, 1949

2,485,256

UNITED STATES PATENT OFFICE 2,485,256

MANUFACTURE OF QUATERNARY NITROGEN COMPOUNDS

Aart Buurman, Velp, Netherlands, assignor to American Enka Corporation, Enka, N. C., a corporation of Delaware No Drawing. Application September 10, 1946, Serial No. 696,032. In Germany February 28, 1941

Section 1, Public Law 690, August 8, 1946
Patent expires February 28, 1961

6 Claims. (Cl. 260—290)

The present invention relates to the manufacture of quaternary nitrogen compounds and more particularly to a process in which cyclic tertiary amines are caused to react with alkyl chlorides having at least eight carbon atoms.

In my copending application Serial No. 696,031, now abandoned, there is described and claimed a process of producing quaternary ammonium chlorides by reacting alkyl chlorides, having at least eight carbon atoms, with aliphatic tertiary amines.

During further development of the method it has been found that cyclic tertiary amines can be used instead of aliphatic tertiary amines whereby excellent yields of quaternary nitrogen compounds are obtained if the substances used are caused to react in the presence of considerable quantities of water. Although it is possible to obtain a reaction, for example, of pyridine with alpha-substituted chlorides to a limited extent without the use of water, the proper reaction fails almost completely if beta-substituted higher hydrocarbons are employed. In a particular case, it has been observed that pyridine reacts with beta-chlor-dodecane in such a manner that the chloride is mainly converted into dodecene when the reaction is carried out in the absence of water, whereas the quaternary pyridinium chloride is formed in a good yield in the presence of a substantial amount of water.

The following examples will serve to further explain the present invention:

Example I 150 gms. of beta-Cl-dodecane, 250 gms. of pyridine and 100 gms. of water were heated in an autoclave for 30 hours at 135° C., while the mixture was continuously agitated. Thereafter the reaction product was purified from by-products by a steam distillation and concentrated when necessary. The yield was 70%. In the absence of water a yield of only 25% was obtained.

Example II

A fraction of American petroleum whose boiling point corresponds to that of decane was chlorinated with chlorine in such a manner, that one molecule of decane contained one atom of chlorine (Cl content 20%). 150 gms. of this product were heated with 250 gms. of pyridine and 100 gms. of water in an autoclave for 24 hours at 135° C. The mixture was continuously agitated, and thereafter purified by means of a steam distillation process. The yield was 55%. In the absence of water, a yield of not more than 16% was obtained.

Example III 150 gms. of alpha-Cl-dodecane, 150 gms. of alpha-picoline and 200 gms. of water were heated in an autoclave for 16 hours at 145° C. while the mixture was continuously agitated. Thereafter the excess picoline and the dodecene formed were removed by means of a steam distillation process and the product was concentrated by passing heated steam through the mixture. The yield was 85%. In the absence of water, a yield of not more than 62% was obtained.

What is claimed is:

1. A process for the preparation of higher molecular quaternary pyridinium chlorides and homologues thereof which comprises mixing, as initial reactants, an alkyl chloride having at least eight carbon atoms and a heterocyclic tertiary amine, in an autoclave containing at least 20% water based on the total weight of the mixture, and heating this aqueous mixture, consisting essentially of said reactants, to an elevated temperature and under an increased pressure to effect a direct reaction between the chloride and amine, and finally purifying the reaction product.

2. A process for the preparation of higher molecular quaternary pyridinium chlorides which comprises mixing, as initial reactants, an alkyl chloride having at least eight carbon atoms and pyridine, in an autoclave containing at least 20% water based on the total weight of the mixture, and heating this aqueous mixture, consisting essentially of said reactants, to an elevated temperature and under an increased pressure to effect a direct reaction between the chloride and pyridine, and finally purifying the reaction product.

3. A process for the preparation of higher molecular quaternary pyridinium chlorides which comprises mixing, as initial reactants, an alkyl chloride having at least eight carbon atoms and pyridine, in an autoclave containing at least 20% water based on the total weight of the mixture, and heating this aqueous mixture, consisting essentially of said reactants, to a temperature of the order of 135° C. and under an increased pressure to effect a direct reaction between the chloride and pyridine, and finally purifying the reaction product.

4. A process as defined in claim 3 in which the chloride is beta-Cl-dodecane.

5. A process as defined in claim 3 in which the chloride is mono-Cl-decane.

6. A process as defined in claim 1 in which the chloride is alpha-Cl-dodecane and the amine is alpha-picoline.

AART BUURMAN.

REFERENCES CITED

The following references are of record in the file of this patent:

UNITED STATES PATENTS

| Number | Name | Date |
| --- | --- | --- |
| 2,050,924 | De Groote | Aug. 16, 1936 |
| 2,295,504 | Shelton | Sept. 8, 1942 |
| 2,242,224 | Bley | May 20, 1945 |
| 2,446,792 | Shelton | Aug. 10, 1948 |

FOREIGN PATENTS

| Number | Country | Date |
| --- | --- | --- |
| 376,396 | Great Britain | Sept. 1, 1932 |
| 743,973 | France | 1933 |
| 458,033 | Great Britain | June 5, 1936 |
| 396,774 | Italy | July 27, 1942 |